(12) United States Patent  (10) Patent No.: US 7,103,243 B2
Norimatsu  (45) Date of Patent: Sep. 5, 2006

(54) OPTICAL SWITCH

(75) Inventor: Toshihide Norimatsu, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 23 days.

(21) Appl. No.: 10/486,459

(22) PCT Filed: Aug. 9, 2002

(86) PCT No.: PCT/JP02/08177

§ 371 (c)(1),
(2), (4) Date: Feb. 9, 2004

(87) PCT Pub. No.: WO03/014799

PCT Pub. Date: Feb. 20, 2003

(65) Prior Publication Data

US 2004/0234191 A1   Nov. 25, 2004

(30) Foreign Application Priority Data

Aug. 10, 2001 (JP) .............................. 2001-243582

(51) Int. Cl.
G02B 6/26 (2006.01)
(52) U.S. Cl. ........................................ 385/18; 359/224
(58) Field of Classification Search .............. 385/16–18
See application file for complete search history.

(56) References Cited

U.S. PATENT DOCUMENTS

| 5,436,986 | A   |   | 7/1995 | Tsai |       |
|-----------|-----|---|--------|------|-------|
| 6,603,591 | B1  | * | 8/2003 | Mori | 359/295 |
| 6,625,343 | B1  | * | 9/2003 | Kato | 385/18 |
| 6,711,321 | B1  | * | 3/2004 | Helin et al. | 385/19 |
| 6,842,555 | B1  | * | 1/2005 | Bhattacharya et al. | 385/18 |

2002/0057864 A1 * 5/2002 Mills et al. .................... 385/18

FOREIGN PATENT DOCUMENTS

| EP | 1 182 487 A1 | 2/2002 |
| EP | 1189092 | 3/2002 |
| JP | 60-159720 | 8/1985 |

(Continued)

OTHER PUBLICATIONS

Imaki, O., et al., "Study of (2×2) x N optical switch by micromachine technology" C-3-82, Central Research Laboratory, Japan Aviation Electronics Industry, Ltd. 2000. p. 208.
Hélin, P., et al., "Self aligned vertical mirrors and V-grooves applied to a self-latching matrix switch for optical n etworks" 13th Annual Int'l. Conf. on Micro Electro Mechanical Systems (MEMS 2000), IEEE, 2000, pp. 467-472.
Imaki, "Study of (2×2) x N optical switch by micromachine technology" Institute of Electronics, Information and Communication Engineers, Tsushin Society Taikai Koen Ronbunshuu, 2000, p. 208, XP002956680.

*Primary Examiner*—Sung Pak
*Assistant Examiner*—Tina M Wong
(74) *Attorney, Agent, or Firm*—David N. Lathrop, Esq.; Gallagher & Lathrop

(57) ABSTRACT

There is provided an optical switch that can be easily manufactured and has hardly any optical loss. A movable board-like electrode disposed in parallel with a fixed board-like electrode with a predetermined space therebetween by a flexible beam-like element, at least two mirrors fabricated on the surface of the movable board-like electrode, and at least three V-shaped grooves for fixing optical fibers are concurrently fabricated by applying an anisotropic etching to a single crystal silicon having its surface of (100) crystal face. In this case, two opposed mirrors are fabricated such that their mirror surfaces form a right angle, and two parallel V-shaped grooves are formed at positions opposed to the mirror surfaces at an angle of 45° thereto. An output side and an input side optical fibers are received and fixed in one of the two V-shaped grooves and the other groove, respectively.

12 Claims, 9 Drawing Sheets

| | FOREIGN PATENT DOCUMENTS | | WO | WO0153874 | 7/2001 |
|----|----|----|----|----|----|
| JP | 2001-042233 | 2/2001 | | | |
| WO | WO 01/53874 A | 7/2001 | * cited by examiner | | |

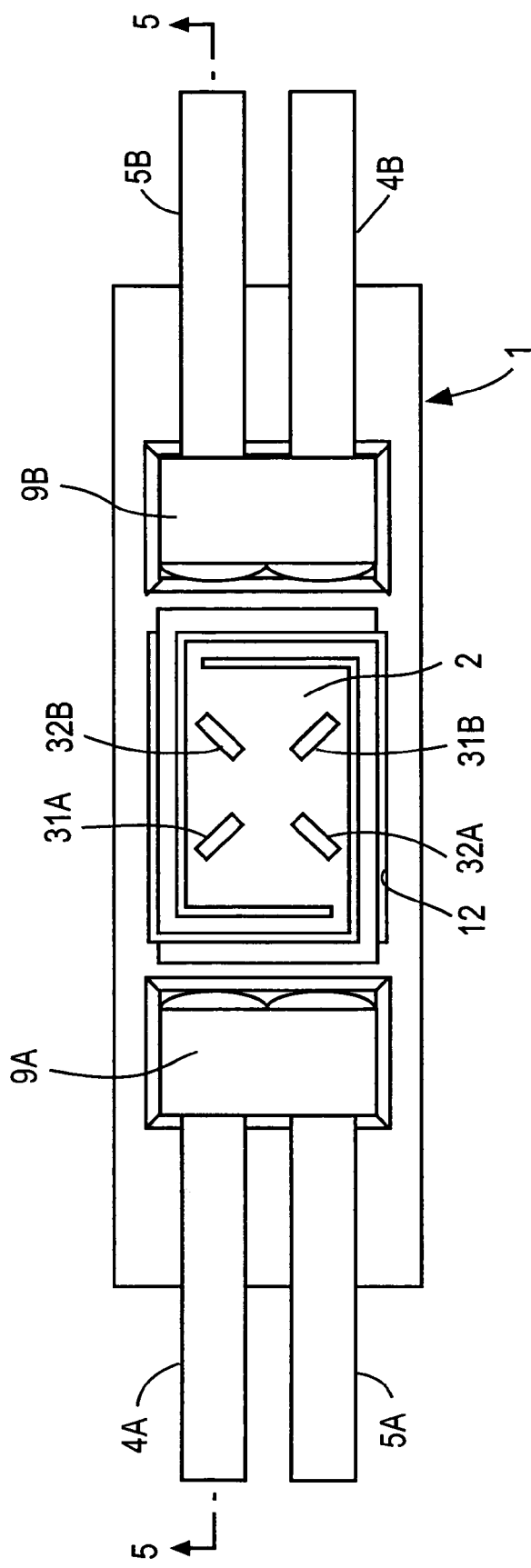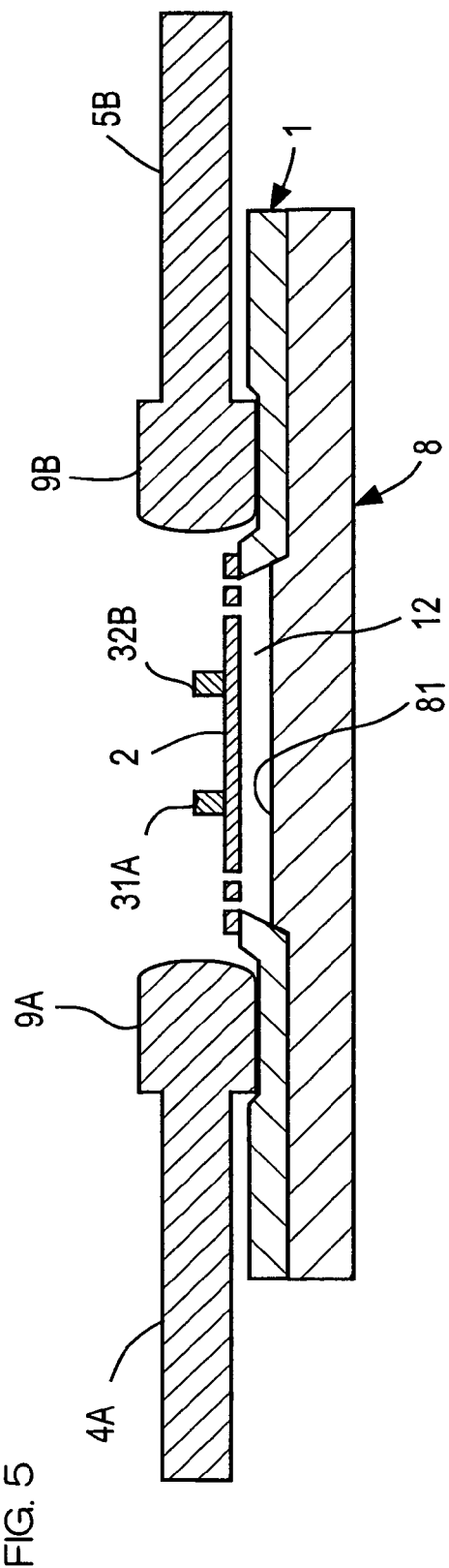

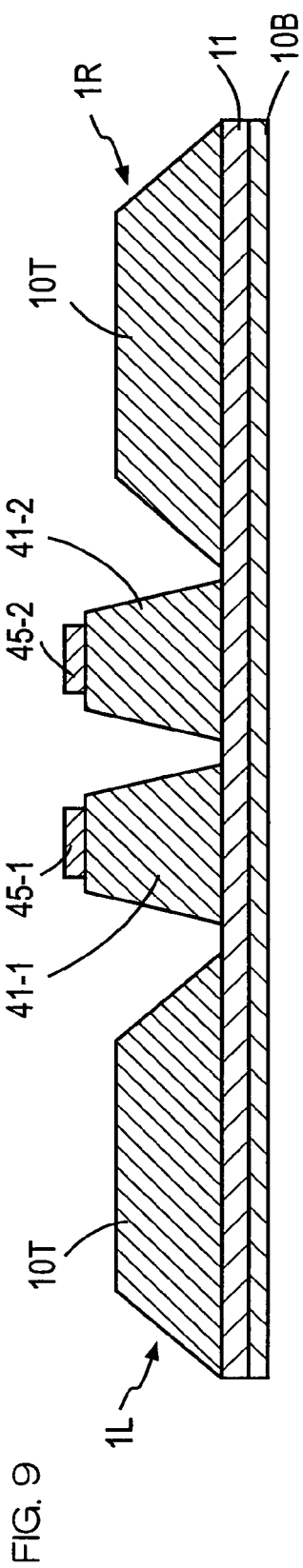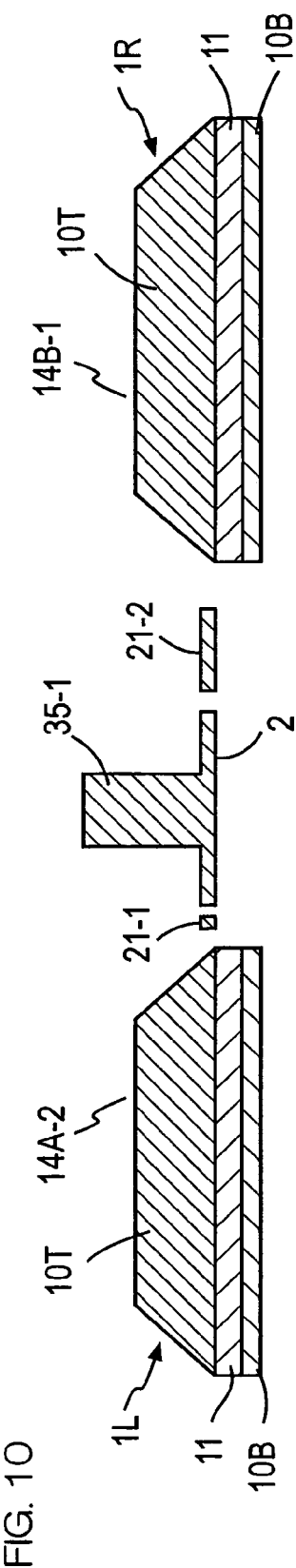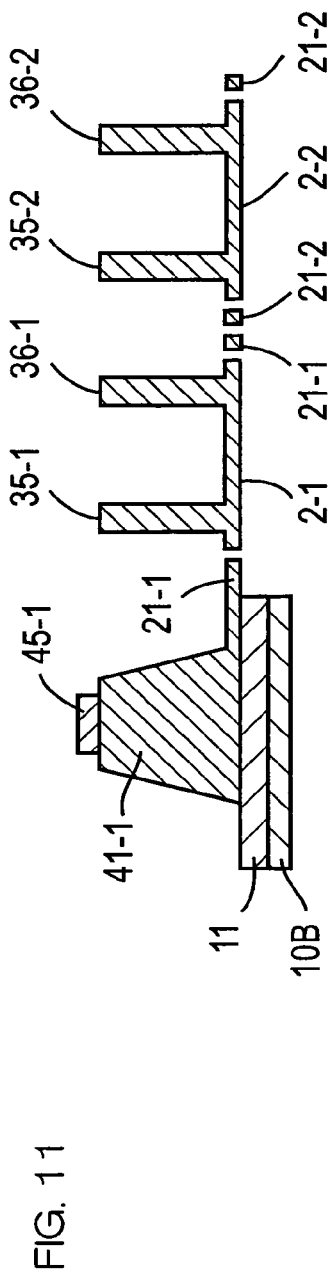

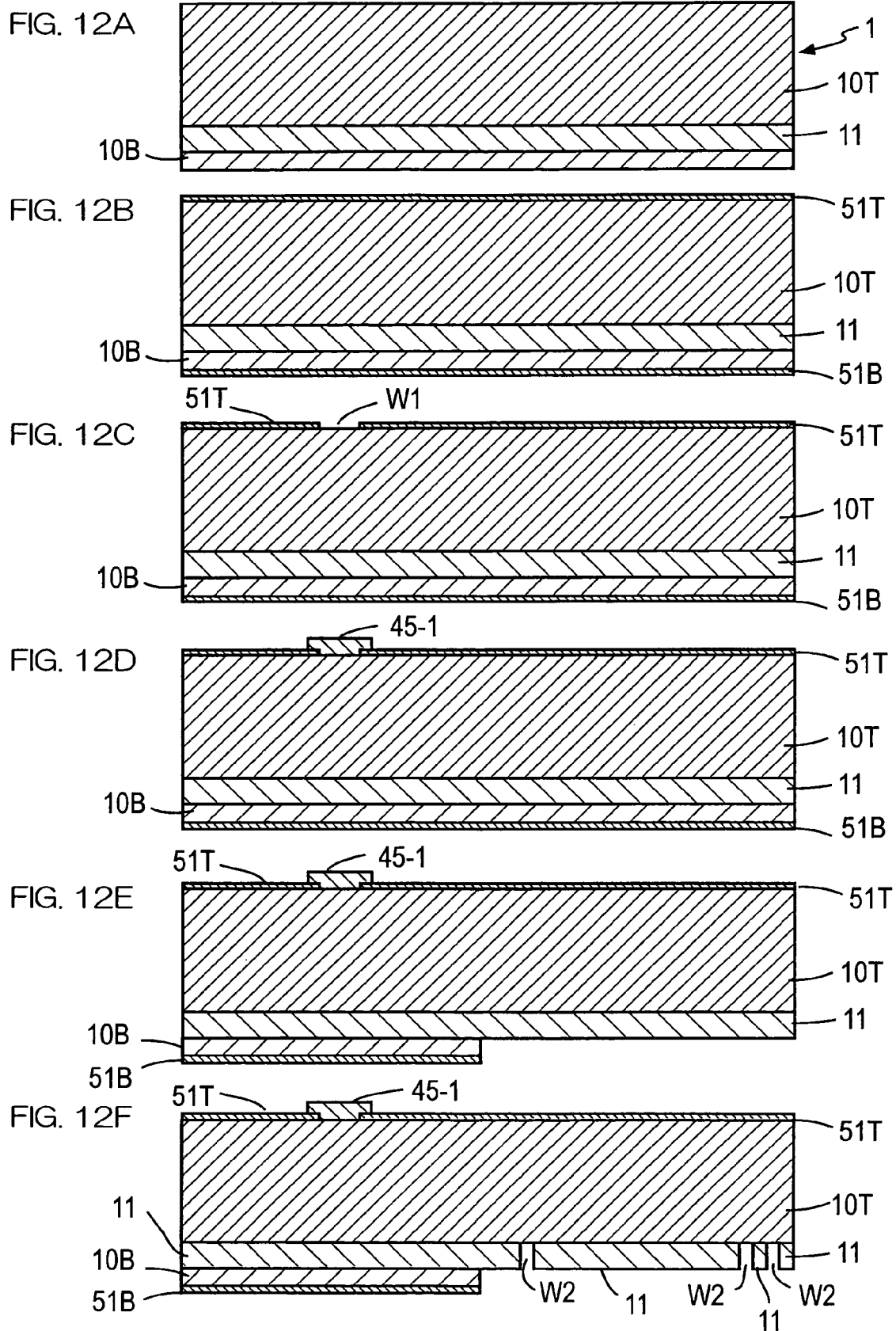

OPTICAL SWITCH

TECHNICAL FIELD

The present invention relates to an optical switch that is used in changing the optical path of an optical signal, and in particular, it can be suitably applied to a 2×2 optical switch that is configured such that it has two output side optical fibers mounted thereto each emitting an optical signal therefrom and two input side optical fibers mounted thereto each receiving an optical signal incident thereon and that is capable of concurrently inputting optical signals emitted respectively from the two output side optical fibers into the corresponding input side optical fibers.

BACKGROUND ART

In a paper entitled "SELF ALIGNED VERTICAL MIRRORS AND V-GROOVES APPLIED TO A SELF-LATCHING MATRIX SWITCH FOR OPTICAL NETWORKS" presented by Philippe Helin, et al. in Thirteenth IEEE International Micro Electro Mechanical Systems Conference (MEMS-2000) held on Jan. 23 through 27, 2000 at Miyazaki, Japan, for example, a technology is described that if an orientation-dependent wet etching or chemical anisotropic wet etching is applied to a single crystal silicon substrate the surface of which is (100) crystal face, a thin board-like or sheet-like mirror that erects from and is integral with the etched silicon substrate and four V-shaped grooves that extend on the silicon substrate along two straight lines orthogonal with each other and passing through the center of the mirror can be fabricated at the same time. In addition, there is another description in this paper that when a mirror erecting from a silicon substrate the surface of which is (100) crystal face is fabricated by applying a chemical anisotropic wet etching to the silicon substrate, the mirror surface of the mirror becomes (100) crystal face so that the accuracy in verticality and flatness of the mirror surface comes to much high, and therefore, the optical loss can be kept to a minimum.

In the optical switch disclosed in the above paper, four optical fibers are mounted in the four V-shaped grooves formed at angular intervals of 90°, respectively, and the optical switch operates such that light signals emitted respectively from two output side optical fibers are switched by the thin board-like mirror so that either one of them is entered into corresponding one input side optical fiber. For example, the optical switch operates such that in case the mirror is situated in the optical path, a light signal emitted from one of the two output side optical fibers disposed at adjacent positions is reflected at right angles to the incident light signal by the front mirror surface or rear mirror surface of the mirror and is entered into corresponding one of the input side optical fibers, and in case the mirror is not situated in the optical path, a light signal emitted from the other output side optical fiber is directly entered into the corresponding one input side optical fiber that is opposed to the other output side optical fiber.

With the manufacturing method described in the above paper, the thin board-like mirror can be formed accurately at a position that the mirror surfaces (front vertical surface and rear vertical surface) thereof form accurately an angle of 45° with the four V-shaped grooves, respectively. However, the thickness of the mirror varies with an error in the etching time so that the thickness thereof can become thicker or thinner than a predetermined thickness, which results in a displacement in position of the mirror surfaces. If the position of the mirror surface should be displaced, the axis of the optical path also deviates so that it is difficult to enter light signals emitted from the two output side optical fibers into corresponding two input side optical fibers at the same time with low optical loss. In other words, in case a 2×2 optical switch is constructed by use of one thin board-like mirror, there occurs a problem that the axis of the optical path deviates.

Further, in FIG. 2 of Japanese Patent Application No. 2000-270621 (filed on Sep. 6, 2000) previously proposed by the present applicant was shown a prior art optical switch having substantially the same construction as that of the optical switch described in the above paper, and defects of this optical switch due to the thickness of a mirror were described with reference to FIG. 3 thereof. The details thereof should be referred to Japanese Patent Application No. 2000-270621.

In the optical switch described in the above paper, in order to make the thickness of the mirror a predetermined thickness, the etching time in applying an anisotropic wet etching to a silicon substrate must be controlled with high precision. For this reason, there is a drawback that the working efficiency is very low.

DISCLOSURE OF THE INVENTION

It is an object of the present invention to provide an optical switch having a plurality of mirrors that is configured such that it correctly reflects a light beam entered thereinto from corresponding one output side optical fiber with very little optical loss thereby to enter the reflected light beam into corresponding one input side optical fiber, and that can be easily manufactured.

It is another object of the present invention to provide a 2×2 optical switch that is configured such that it correctly reflects light beams entered thereinto respectively from two output side optical fibers with very little optical loss thereby to enter the reflected light beams into corresponding two input side optical fibers, and that can be easily manufactured.

In order to accomplish the above objects, in an aspect of the present invention, there is provided an optical switch comprising: a substrate; a fixed board-like electrode; a movable board-like electrode that is mounted in parallel with the fixed board-like electrode with a predetermined space therebetween by a flexible beam-like element connected to the substrate; a plurality of mirrors that are formed on the surface of said movable board-like electrode; a plurality of optical fibers that are positioned and fixed in a plurality of V-shaped grooves respectively formed on the substrate along a plurality of straight lines in parallel with each other passing through the mirrors; and wherein by applying a voltage between the fixed board-like electrode and the movable board-like electrode, the movable board-like electrode and the mirrors are moved together toward the fixed board-like electrode thereby to switch an optical path for an incident optical signal, and characterized in that each of the substrate and the movable board-like electrode consists of a single crystal silicon having its surface of (100) crystal face; and that the plural mirrors have their mirror surfaces formed by coating vertical (100) crystal faces with a substance having high reflectivity, the vertical (100) crystal faces being fabricated by applying an anisotropic etching to a single crystal silicon having its surface of (100) crystal face, and two opposed mirror surfaces forming a right angle with each other.

In a preferred embodiment, the aforesaid mirrors are two, and each mirror has two mirror surfaces forming a right angle with each other, and the two mirrors are formed on the surface of the movable board-like electrode integrally therewith in such manner that opposed mirror surfaces thereof form a right angle with each other.

Alternatively, four mirrors each of which has a thin board-like shape and one mirror surface, may be fabricated on the surface of the movable board-like electrode integrally therewith in such manner that each mirror surface forms an angle of 45° with corresponding one V-shaped groove and two opposed mirror surfaces form a right angle with each other.

The V-shaped grooves are four, and are formed by applying an anisotropic etching to the substrate consisting of a single crystal silicon having its surface of (100) crystal face, the groove surfaces of each V-shaped groove being (111) crystal faces.

In addition, the four V-shaped grooves are formed such that two of them are formed on one side of the movable board-like electrode and the remaining two of them are formed on the opposite side of the movable board-like electrode along two parallel straight lines each passing through corresponding one mirror surface at an angle of 45° thereto.

The movable board-like electrode, the mirrors and the V-shaped grooves are concurrently fabricated by applying an anisotropic etching to a single crystal silicon having its surface of (100) crystal face.

With the present invention, since an anisotropic etching is applied to a single crystal silicon layer having its surface of (100) crystal face using the same etchant, a plurality of mirrors each of which has a mirror surface of (100) crystal face and in which two opposed mirror surfaces form a right angle with each other as well as V-shaped grooves for positioning and fixing optical fibers that are aligned with the mirrors respectively are concurrently fabricated, and each mirror and corresponding one V-shaped groove are aligned with each other with high accuracy. Accordingly, whether the etching time is longer or shorter, the two opposed mirror surfaces form correctly a right angle, and hence the mirrors can always reflect an incident optical signal emitted from an output side optical fiber two times with high accuracy by the two opposed mirror surfaces with little optical loss and enter the reflected optical signal into an input side optical fiber.

In addition, since the mirrors and the V-shaped grooves are concurrently fabricated by applying an anisotropic etching to a single crystal silicon layer having its top surface of (100) crystal face, mask patternings before the anisotropic etching is carried out can be done at a time. The anisotropic etching is carried out only once, and hence the mirrors and the V-shaped grooves can be fabricated at the same time by one mask patterning and one anisotropic etching. Moreover, there is no need to control the etching time with high precision, and therefore, it is very easy to manufacture the optical switch and the working efficiency is greatly improved.

BRIEF DESCRIPTION OF THE DRAWINGS

FIG. 4 is a plan view showing one example of the 2×2 optical switch to which the present invention can be applied.

FIG. 5 is a sectional view taken along the line 5—5 in FIG. 4 and looking in the direction indicated by the arrows.

FIG. 9 is a sectional view taken along the line 9—9 in FIG. 8 and showing only sectioned surfaces.

FIG. 10 is a sectional view taken along the line 10—10 in FIG. 8 and showing only sectioned surfaces.

FIG. 11 is a sectional view taken along the line 11—11 in FIG. 8 and showing only sectioned surfaces.

FIGS. 12A to 12K are sectional views for explaining one example of the manufacturing method of the optical switch shown in FIG. 8 in sequence of process steps and showing only the sectioned surfaces.

BEST MODE FOR CARRYING OUT THE INVENTION

The preferred embodiment of the present invention will now be described in detail with reference to the accompanying drawings. The present invention may, however, be embodied in many different forms and should not be construed as limited to the embodiment set forth hereinafter; rather, the embodiment is provided so that this disclosure will be thorough and complete, and will fully convey the scope of the invention to those skilled in the art.

First, an example of the 2×2 optical switch to which the present invention is suitably applied will be described with reference to FIGS. 1 to 5. Further, since the 2×2 optical switch has been described in the above-stated Japanese Patent Application No. 2000-270621 (P2000-270621), the details thereof should be referred to Japanese Patent Application No. 2000-270621.

Figure 1:
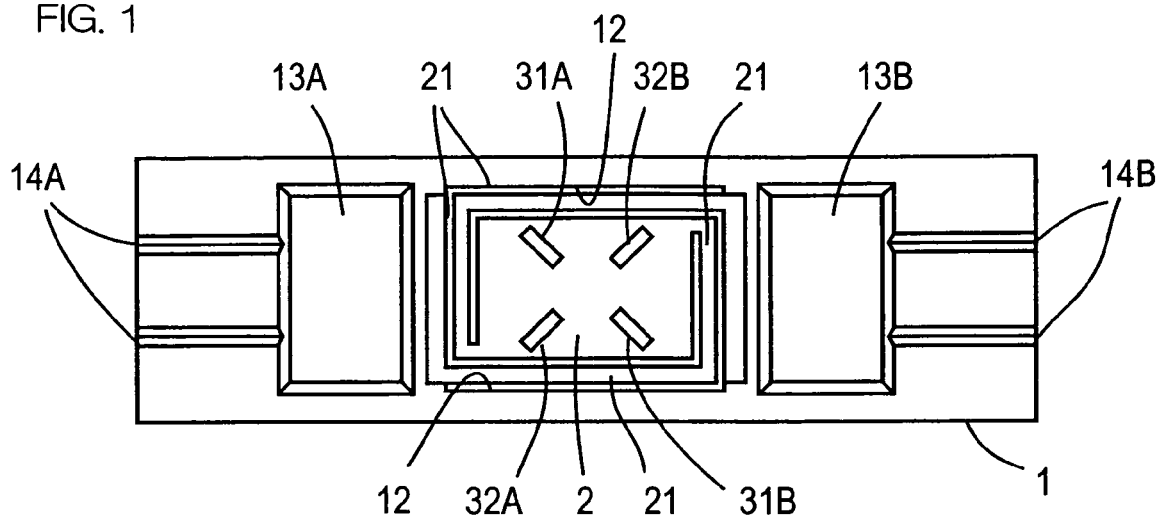
FIG. 1 is a plan view showing mainly a single crystal silicon substrate, a movable board-like electrode, mirrors, recesses and V-shaped grooves of one example of the 2×2 optical switch to which the present invention can be applied.

FIG. 1 is a plan view showing mainly a single crystal silicon substrate 1 having a generally rectangular shape and a movable board or plate-like electrode 2 having a generally rectangular shape that is formed integrally with the substrate 1, both of which are components of a 2×2 optical switch to which the present invention can be applied. On the movable board-like electrode 2 are formed four thin board-like or sheet-like micro-mirrors 31A, 32A, 31B, and 32B formed integrally with the movable electrode board 2. On both sides of the movable board-like electrode 2 in the longitudinal direction of the substrate 1 are formed recesses 13A and 13B each having a generally rectangular shape with a predetermined space from the movable board-like electrode 2 and V-shaped grooves 14A and 14B, two grooves 14A of which are in parallel with each other and extend from one end of the substrate 1 in the longitudinal direction thereof (one minor side of the substrate 1) to the corresponding recess 13A and the remaining two grooves 14B of which are in parallel with each other and extend from the opposite end of the substrate 1 in the longitudinal direction thereof (the opposite minor side of the substrate 1) to the corresponding recess 13B.

A window 12 having a rectangular shape is formed in the substrate 1 at the central portion thereof and the movable board-like electrode 2 is situated above and at the center of the window 12, the movable board-like electrode 2 being smaller in size than the window 12. The movable board-like electrode 2 is supported by two flexible beams (each called "flexure") 21 to be movable upward and downward, each flexible beam having a plurality of generally rectangular turns. Each of the beams 21 has its forward end fixed to corresponding one of the opposed corners of the movable board-like electrode 2 and has its base fixed to the substrate 1 at a position thereof between the recess 13A or 13B and the window 12.

The four thin board-like micro-mirrors 31A, 32A, 31B and 32B have substantially the same shape and size with one another, and the two micro-mirrors 31A and 31B are disposed on a first straight line that passes through substantially the center of the movable board-like electrode 2 and forms an angle of 45° with a horizontal line. The remaining two micro-mirrors 32A and 32B are disposed on a second straight line that passes through substantially the center of the movable board-like electrode 2 and is orthogonal to the first straight line. These micro-mirrors 31A, 32A, 31B and 32B are disposed at such positions that they are away by substantially the same distance in the radial direction from the intersection between the first and second straight lines and that axial lines of corresponding two V-shaped grooves 14A and of corresponding two V-shaped grooves 14B pass through substantially the centers of the micro-mirrors.

Figure 2:
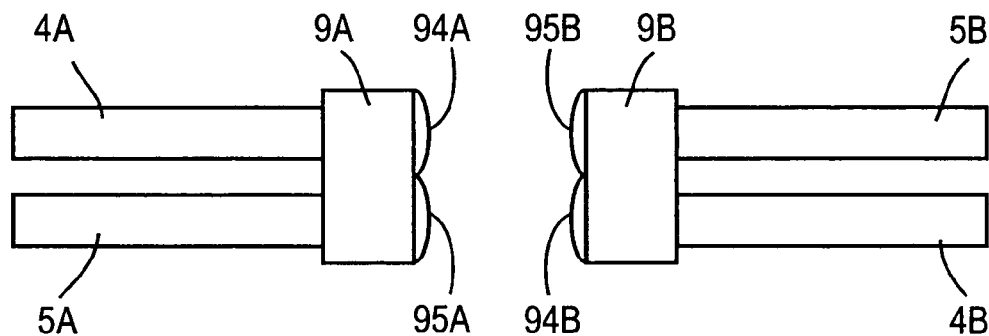
FIG. 2 is a plan view showing one example of micro-lens arrays and optical fibers received respectively in the recesses and the V-shaped grooves shown in FIG. 1.

The two recesses 13A and 13B have the same shape and size with each other, and in the recesses 13A and 13B are received micro-lens arrays 9A and 9B, respectively. The micro-lens array 9A has two micro-lenses 94A and 95A juxtaposed in parallel with each other as shown in FIG. 2 and the micro-lens array 9B also has two micro-lenses 94B and 95B juxtaposed in parallel with each other as shown in FIG. 2. Since two optical fibers 4A and 5A are aligned with and mounted to the micro-lens array 9A as well as two optical fibers 4B and 5B are aligned with and mounted to the micro-lens array 9B, in case of accommodating the micro-lens arrays 9A and 9B in the corresponding recesses 13A and 13B respectively, the optical fibers 4A, 5A and 4B, 5B mounted to the micro-lens arrays 9A and 9B respectively are received and positioned in the V-shaped grooves 14A and 14B, respectively, at the same time.

An output side optical fiber and an input side optical fiber are mounted to each of the micro-lens arrays. In the illustrated example, one optical fiber 4A in the two optical fibers 4A and 5A mounted to the micro-lens array 9A is an output side optical fiber and the other optical fiber 5A is an input side optical fiber. Likewise, one optical fiber 4B in the two optical fibers 4B and 5B mounted to the micro-lens array 9B is an output side optical fiber and the other optical fiber 5B is an input side optical fiber. These optical fibers are arranged such that the output side optical fiber 4A mounted to the one micro-lens array 9A is opposed to and aligned with the input side optical fiber 5B mounted to the other micro-lens array 9B (they are disposed on the same optical axis) and the input side optical fiber 5A mounted to the one micro-lens array 9A is opposed to and aligned with the output side optical fiber 4B mounted to the other micro-lens array 9B (they are disposed on the same optical axis).

Figure 3:
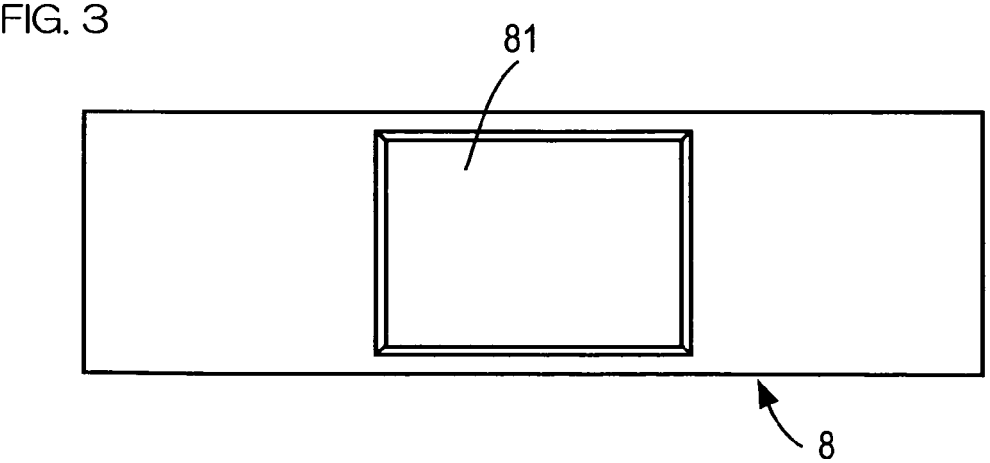
FIG. 3 is a plan view showing a fixed board-like electrode.

As shown in FIG. 3, a fixed or stationary board-like electrode 8 is constituted by a single crystal silicon substrate that is of a substantially the same shape and size as those of the substrate 1. The peripheral portion of the fixed board-like electrode 8 is removed by etching to form an elevated portion 81 having a generally rectangular shape at the central portion of the top surface of the electrode 8, the elevated portion 81 having substantially the same shape and size with the window 12 of the substrate 1. The fixed board-like electrode 8 is mounted to the substrate 1 at the underside thereof such that the elevated portion 81 thereof operating as a fixed electrode is opposed to the movable board-like electrode 2 with a predetermined space therebetween.

FIG. 4 is a plan view of a 2×2 optical switch comprising the substrate 1 shown in FIG. 1; an assembly of the optical fibers 4A, 5A and the micro-lens array 9A shown in FIG. 2 that is mounted on the substrate 1; an assembly of the optical fibers 4B, 5B and the micro-lens array 9B shown in FIG. 2 that is mounted on the substrate 1; and the fixed board-like electrode 8 shown in FIG. 3 that is mounted to the substrate 1. FIG. 5 is a sectional view taken along the line 5—5 in FIG. 4 and looking in the direction indicated by the arrows.

As shown in FIG. 4, in the illustrated 2×2 optical switch, the two mirrors 31A and 32B are formed on the movable board-like electrode 2 integrally therewith between the output side optical fiber 4A mounted to the one micro-lens array 9A and the input side optical fiber 4B mounted to the other micro-lens array 9B in such manner that they form an angle of 45° with the respective optical fibers, and likewise, the two mirrors 32A and 31B are formed on the movable board-like electrode 2 integrally therewith between the input side optical fiber 5A mounted to the one micro-lens array 9A and the output side optical fiber 4B mounted to the other micro-lens array 9B in such manner that they form an angle of 45° with the respective optical fibers.

In addition, as shown in FIG. 5, the fixed board-like electrode 8 is mounted to the substrate 1 at the underside thereof in such manner that the elevated portion 81 thereof fits in the window 12 formed in the substrate 1. Accordingly, the elevated portion 81 of the fixed board-like electrode 8 and the movable board-like electrode 2 are opposed to each other with a predetermined space therebetween through the window 12, and the movable board-like electrode 2 is permitted to be displaced or moved downwardly through the window 12. As a result, if a predetermined voltage is applied between the fixed board-like electrode 8 and the movable board-like electrode 2 to produce an electrostatic attraction therebetween in such direction that the fixed board-like electrode 8 and the movable board-like electrode 2 are attracted to each other, the movable board-like electrode 2 is downwardly displaced, and hence the mirrors 31A, 32A and 31B, 32B formed on and upstanding from the top surface of the movable board-like electrode 2 are also displaced downwardly to a position where the mirrors are out of the optical paths formed by the optical fibers. Thus, it is possible to switch an optical path through which an optical signal outputted from the output side optical fiber 4A or 4B will propagate.

By the way, the 2×2 optical switch constructed as discussed above is manufactured by use of micromachining technology, and the four mirrors 31A, 32A and 31B, 32B are formed of a photosensitive resin by use of photolithography. Specifically, the four mirrors 31A, 32A and 31B, 32B are formed by applying a photosensitive resin on the top surface of the silicon substrate 1, exposing only portions of the formed photosensitive resin film on which the mirrors are to be formed, thereafter removing the photosensitive resin film except for the exposed portions thereof by use of a solvent to form four mirror bodies, and coating mirror surfaces of these mirror bodies with a metal.

Figure 6A:
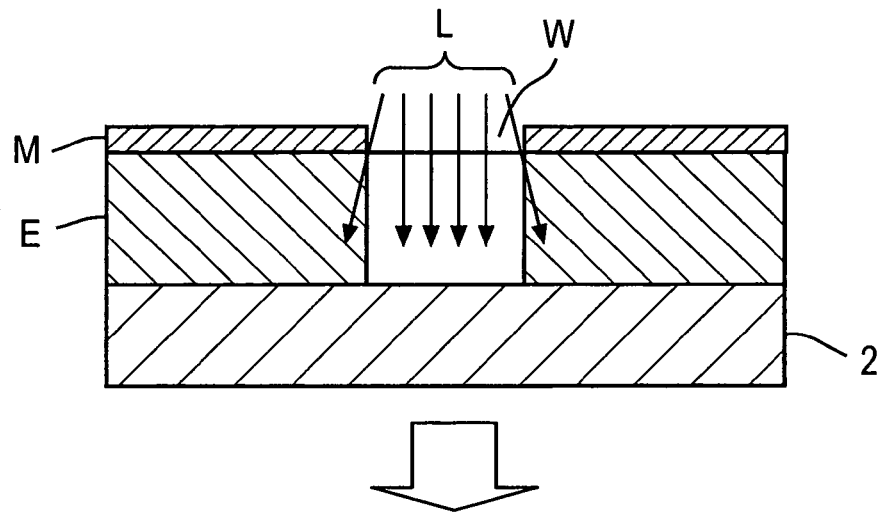
FIG. 6A is an outlined sectional view for explaining a manufacturing process of a mirror made of a photosensitive resin.
Figure 6B:
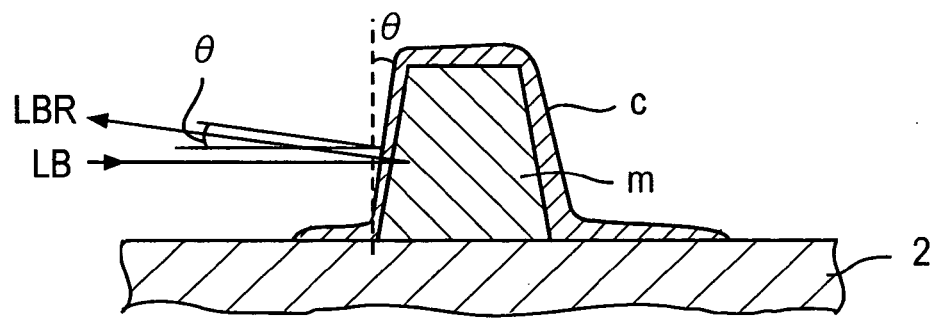
FIG. 6B is an outlined sectional view for explaining a disadvantage of a mirror made of a photosensitive resin.

In this way, in case of forming the mirrors using a photosensitive resin, it is difficult to make the mirror surfaces flat due to a contraction resulting from hardening of the photosensitive resin in the manufacturing process of the mirrors, and therefore, the reflection characteristic of light is deteriorated. For this reason, it comes to one of the factors by which the optical loss is increased. In addition, portions of the photosensitive resin on which the mirrors are to be formed are exposed in the manufacturing process of the mirrors. In such exposure, as shown in FIG. 6A, a portion of light L exposed through a window W of a mask M runs obliquely in the vicinity of the mask due to diffraction. Due to that a portion of the exposed light runs obliquely and other causes, the formed mirror body m has its vertical surface (mirror surface) which inclines by an angle of θ from a vertical plane orthogonal to the top surface of the movable board-like electrode 2. As a result, it is difficult to make the mirror surface vertical. For this reason, the surface of the metal coating c deposited on the surface of the mirror body m also inclines by an angle of θ, and the reflected light beam LBR resulting from the entered light beam LB deviates upwardly by an angle of θ from a horizontal plane in parallel with the top surface of the movable board-like electrode 2. This fact also comes to one of the factors by which the optical loss is increased.

Figure 7A:
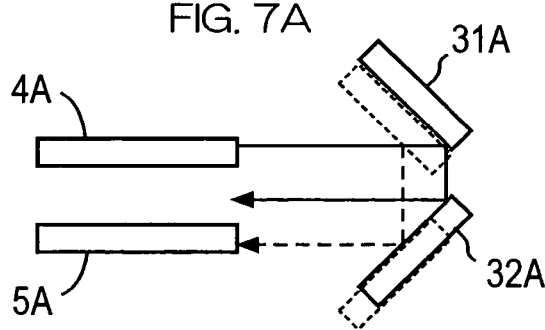
FIGS. 7A, 7B and 7C are plan views for explaining the relationship between a displacement in position of a mirror and the axis of an optical path.
Figure 7B:
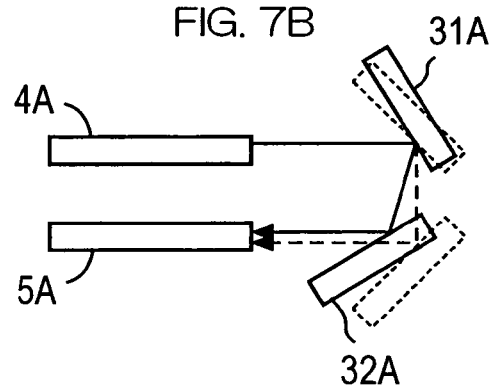
Figure 7C:
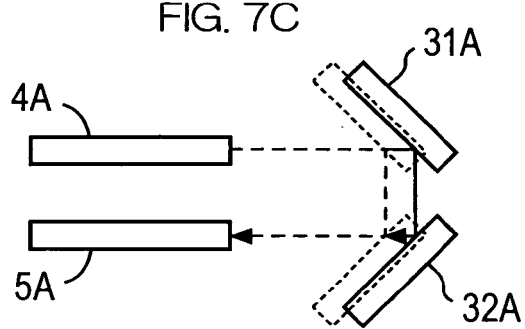

Moreover, in the optical switch constructed as described above, the V-shaped grooves 14A, 14B and the mirrors 31A, 32A and 31B, 32B are independently formed by use of mask patterning and etching. Accordingly, there is a much possibility that a displacement or an error occurs in the mutual relationship of position between the V-shaped grooves 14A, 14B and the mirrors 31A, 32A and 31B, 32B, and this fact also becomes one of the factors by which the optical loss is increased. For example, in case the mirrors 31A, 32A are taken as an example, if the positions of the mirrors 31A, 32A are displaced from the proper positions on which they are to be formed shown by a dotted line to positions shown by a solid line as shown in FIG. 7A, a light beam emitted from the output side optical fiber 4A is not entered into the input side optical fiber 5A because the reflecting optical axes of the light beam are deviated as shown in the figure. In addition, if the positions of the mirrors 31A, 32A are displaced from the proper positions on which they are to be formed shown by a dotted line to positions shown by a solid line as shown in FIG. 7B, though a light beam emitted from the output side optical fiber 4A is deviated in its reflecting optical axes as shown in the figure, it is entered into the input side optical fiber 5A. Moreover, if the positions of the mirrors 31A, 32A are displaced from the proper positions on which they are to be formed shown by a dotted line to positions shown by a solid line as shown in FIG. 7C, a light beam emitted from the output side optical fiber 4A is entered into the input side optical fiber 5A without any deviation of the reflecting optical axes thereof.

In such way, if the optical switch is configured such that the output side optical fiber 4A and the input side optical fiber 5A adjoin each other and are juxtaposed in parallel with each other, and that a light beam emitted from the output side optical fiber 4A is reflected twice by an angle of 90° at a time, namely, reflected by 180° in total and then entered into the input side optical fiber 5A, a deviation of the reflecting axes is decreased. Further, a method of manufacturing the above-stated 2×2 optical switch was described in detail in the above Japanese Patent Application No. 2000-270621, and the explanation thereof beyond the foregoing will be omitted here.

The present invention is suitably applied to a 2×2 optical switch having, for example, such construction and structure as shown in FIGS. 1 to 5 and makes use of the technology for forming mirrors and V-shaped grooves disclosed in the above-mentioned paper presented by Philippe Helin, et al. The 2×2 optical switch to which the present invention is applied has two or four mirrors formed integrally with a movable board-like electrode and erecting from the movable board-like electrode, the mirrors being formed with high accuracy at such positions that two opposed mirror surfaces form a right angle and yet each mirror surface always maintains a proper angle of 45° with the axis of an optical path, even if the etching time is not controlled with high precision. Accordingly, there is provided a 2×2 optical switch in which the optical loss can be kept to a minimum and that can be easily manufactured.

Figure 8:
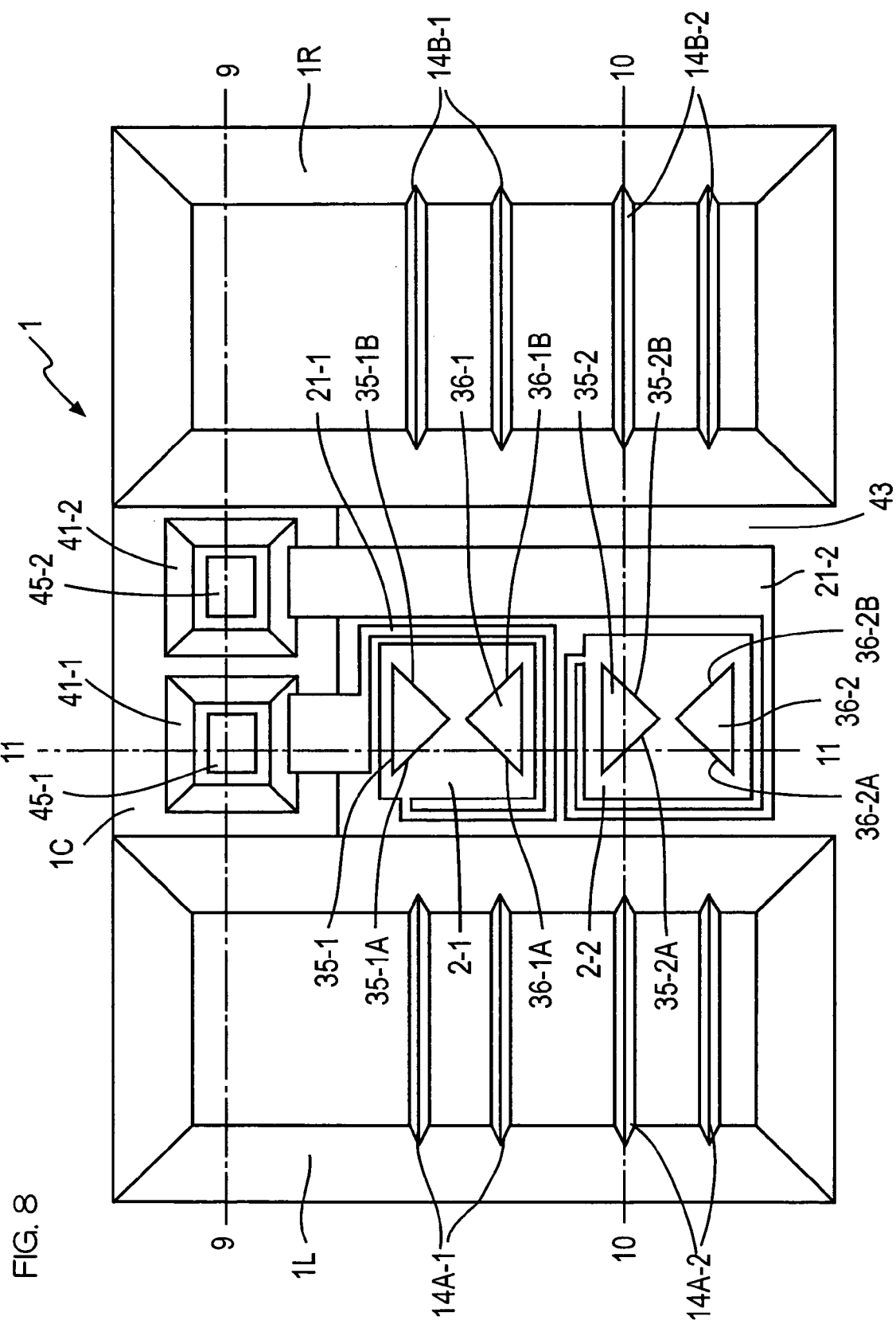
FIG. 8 is a plan view showing one embodiment of the optical switch according to the present invention with optical fibers and a fixed board-like electrode removed.

FIG. 8 is a plan view showing one embodiment of the optical switch according to the present invention with optical fibers and a fixed board-like electrode removed, FIG. 9 is a sectional view taken along the line 9—9 in FIG. 8 and showing only sectioned surfaces, FIG. 10 is a sectional view taken along the line 10—10 in FIG. 8 and showing only sectioned surfaces, and FIG. 11 is a sectional view taken along the line 11—11 in FIG. 8 and showing only sectioned surfaces.

The optical switch shown in FIG. 8 is constituted, as shown in the sectional views of FIGS. 9 to 11, by two 2×2 optical switches that are formed on an SOI (Silicon on Insulator) substrate I of three-layer structure comprising a silicon dioxide layer ($SiO_2$ layer) 11, and two single crystal silicon layers 10T and 10B formed on both surfaces of the silicon dioxide layer 11 each having a predetermined thickness. Further, for clarity of explanation, in FIG. 8, elements and portions corresponding to those in FIGS. 1 to 5 will be denoted by the same reference characters with a suffix "-1" attached thereto as to one 2×2 optical switch and with a suffix "-2" attached thereto as to the other 2×2 optical switch, and explanation thereof will be omitted unless necessary.

As shown in FIG. 8, the SOI substrate 1 has an opening 43 having a generally rectangular shape formed therethrough that is extending from the central portion of the lower side edge of the substrate 1 in the longitudinal direction thereof in the figure toward the upper side edge thereof by about a length of ⅔ of the minor side of the substrate 1 in this example so that the substrate 1 has an inverted channel-shape constituted by rectangular portions 1L and 1R positioned at both sides of the opening 43 and a central leg portion 1C connecting between the rectangular portions 1L and 1R, each rectangular portion has its vertical side longer than its horizontal side in the figure.

The one 2×2 optical switch comprises: a movable board-like electrode 2-1 having a generally square shape; two mirrors 35-1 and 36-1 formed on the movable board-like electrode 2-1 integrally therewith and erecting therefrom, each mirror having a generally right angle isosceles triangular shape in plan; V-shaped grooves 14A-1 and 14B-1 that are formed on the rectangular portions 1L and 1R of the substrate 1 respectively each having longer vertical side, positioned at both sides of the movable board-like electrode 2-1, one pair of the grooves 14A-1 being formed on the rectangular portion 1L in parallel with each other and the other pair of the grooves 14B-1 being formed on the rectangular portion 1R in parallel with each other; and a flexible beam 21-1 for supporting the movable board-like electrode 2-1 to be movable upward and downward, the flexible beam having a plurality of generally rectangular turns. The beams 21-1 has its forward end connected to corresponding one of the corners of the movable board-like electrode 2-1 and has its base connected to the base of an electrode support 41-1 having a generally truncated pyramidal shape formed on the substrate 1. On the top surface of the electrode support 41-1 is formed an electrode 45-1. In addition, the two mirrors 35-1 and 36-1 of a generally right angle isosceles triangle in plan are formed in such manner that their vertical angles each forming an angle of 90° are opposed to each other in the vertical direction in the figure as well as the two mirrors are symmetrical. The parallel two V-shaped grooves 14A-1 and the parallel two V-shaped grooves 14B-1 are formed in such manner that they are in parallel with each other in the horizontal direction (in the direction of the respective minor sides of the rectangular portions 1L and 1R each having longer vertical side) as well as they are aligned with each other along a horizontal line.

The other 2×2 optical switch comprises: a movable board-like electrode 2-2 having a generally square shape; two mirrors 35-2 and 36-2 formed on the movable board-like electrode 2-2 integrally therewith and erecting therefrom, each mirror having a generally right angle isosceles triangular shape in plan; V-shaped grooves 14A-2 and 14B-2 that are formed on the rectangular portions 1L and 1R of the substrate 1 respectively each having longer vertical side, positioned at both sides of the movable board-like electrode 2-2, one pair of the grooves 14A-2 being formed on the rectangular portion IL in parallel with each other and the other pair of the grooves 14B-2 being formed on the rectangular portion 1R in parallel with each other; and a flexible beam 21-2 for supporting the movable board-like electrode 2-2 to be movable upward and downward, the flexible beam having a plurality of generally rectangular turns. The beams 21-2 has its forward end connected to corresponding one of the corners of the movable board-like electrode 2-2 and has its base connected to the base of an electrode support 41-2 having a generally truncated pyramidal shape formed on the substrate 1. On the top surface of the electrode support 41-2 is formed an electrode 45-2. In addition, the two mirrors 35-2 and 36-2 of a generally right angle isosceles triangle in plan are formed in such manner that their vertical angles each forming an angle of 90° are opposed to each other in the vertical direction in the figure as well as the two mirrors are symmetrical. The parallel two V-shaped grooves 14A-2 and the parallel two V-shaped grooves 14B-2 are formed in such manner that they are in parallel with each other in the horizontal direction (in the direction of the respective minor sides of the rectangular portions 1L and 1R each having longer vertical side) as well as they are aligned with each other along a horizontal line.

The two movable board-like electrodes 2-1 and 2-2 are located within the opening 43 of the substrate 1, and are supported to be movable upwardly and downwardly in the space within the opening 43 by the corresponding flexible beams 21-1 and 21-2, respectively. In addition, the two electrode supports 41-1 and 41-2 are formed on the central leg portion 1C, in this example, in such manner that they are juxtaposed in the horizontal direction in the figure.

The mirrors 35-1, 36-1 and 35-2, 36-2 each having a generally right angle isosceles triangular shape in plan are formed, at the same time when the movable board-like electrodes 2-1 and 2-2 are formed, by applying an orientation-dependent wet etching or chemical anisotropic wet etching to one single crystal silicon layer (a thicker single crystal silicon layer on the upper side in FIGS. 9 to 11) 10T, the surface of which is (100) crystal face, on the top surface of the SOI substrate 1. Two vertical surfaces 35-1A and 35-1B of the mirror 35-1 forming an angle of 90° with each other, two vertical surfaces 36-1A and 36-1B of the mirror 36-1 forming an angle of 90° with each other, two vertical surfaces 35-2A and 35-2B of the mirror 35-2 forming an angle of 90° with each other, and two vertical surfaces 36-2A and 36-2B of the mirror 36-2 forming an angle of 90° with each other have much high accuracy in their verticality and flatness as described in the above-mentioned paper presented by Philippe Helin, et al., and hence they can reflect an incident light substantially perfectly (with very little optical loss) and there is no possibility that the reflected light deviates vertically from a horizontal plane. In practice, the vertical surfaces 35-1A and 35-1B, 36-1A and 36-1B, 35-2A and 35-2B, and 36-2A and 36-2B are coated with a metal such as chromium (Cr), gold (Au), or the like thereby to form the mirror surfaces. Further, in FIG. 8, though each of the mirrors 35-1, 36-1 and 35-2, 36-2 is shown to have a generally right angle isosceles triangular shape, this is for easy understanding thereof. In practice, corners of each mirror become a crystal face of higher order, which does not result in an angular shape. In particular, the vertical angle portion becomes a considerably collapsed shape. However, the two mirror surfaces 35-1A and 35-1B, 36-1A and 36-1B, 35-2A and 35-2B, and 36-2A and 36-2B of the mirrors 35-1, 36-1 and 35-2, 36-2 maintain that the two mirror surfaces form an angle of 90° with each other with high accuracy.

In addition, when the mirrors 35-1, 36-1 and 35-2, 36-2 are formed, the V-shaped grooves 14A-1 and 14B-1, 14A-2 and 14B-2 are also formed by applying an anisotropic wet etching to the upper side single crystal silicon layer 10T of the SOI substrate 1 at the same time. Therefore, these V-shaped grooves 14A-1 and 14B-1, 14A-2 and 14B-2 and the mirrors 35-1, 36-1 and 35-2, 36-2 can be concurrently fabricated at predetermined positions with high accuracy without controlling the etching time precisely, as described later on.

Thus, even if the etching time is not controlled with precision, it is possible to fabricate two mirrors formed integrally with a corresponding movable board-like electrode with high accuracy in such manner that the opposed two mirror surfaces 35-1A and 36-1A, 35-1B and 36-1B, 35-2A and 36-2A, and 35-2B and 36-2B each pair reflecting an incident light beam twice by 90° at a time always form a right angle and yet each mirror surface always maintains a proper angle of 45° with the axis of an optical path. Since the mirror surfaces of the mirrors have much high accuracy in their verticality and flatness, they can reflect an incident light beam correctly at an angle of 90° and hence optical loss can be minimized. In addition, since the mirrors, the movable board-like electrodes, the V-shaped grooves, and the flexible beams are concurrently fabricated by applying an anisotropic wet etching to a single crystal silicon layer, they are easily fabricated and the working efficiency is remarkably improved.

Further, in the above embodiment, a case that two 2×2 optical switches have been formed on the upper side single crystal silicon layer 10T of the SOI substrate 1 has been discussed. It is needless to say that the number of 2×2 optical switches to be formed on the SOI substrate 1 may be one or larger than 2. In addition, it goes without saying that in a case that four thin board-like mirrors as shown in FIG. 4 may be formed on each of the movable board-like electrodes by applying an anisotropic wet etching to a single crystal silicon layer, that is, eight thin board-like mirrors may be fabricated at the same angular positions as those of the two mirror surfaces 35-1A and 35-1B, 36-1A and 36-1B, 35-2A and 35-2B, and 36-2A and 36-2B of the mirrors 35-1, 36-1 and 35-2, 36-2, the same function and effects can also be obtained.

Next, an example of the manufacturing process by which the movable board-like electrodes 2-1 and 2-2, the flexible beams 21-1 and 21-2, the mirrors 35-1, 36-1 and 35-2, 36-2, the V-shaped grooves 14A-1, 14A-2 and 14B-1, 14B-2, the electrode supports 41-1 and 41-2, the electrodes 45-1 and 45-2, and the like are formed on the upper side single crystal silicon layer 10T of the SOI substrate 1, the surface of which is (100) crystal face, will be described with reference to FIGS. 12A to 12K. Further, FIGS. 12A to 12K are sectional views that show only the sectioned surfaces corresponding to FIG. 11. In order to make the figures simple, there are not shown in the figures the movable board-like electrode 2-2, the mirrors 35-2, 36-2, the V-shaped grooves 14B-1, 14B-2, the electrode support 41-2, the electrode 45-2 and the like that constitute the other 2×2 optical switch having substantially the same construction and structure as those of the one 2×2 optical switch. In addition, since a fixed board-like electrode having substantially the same construction and structure as those of, for example, the fixed board-like electrode shown in FIGS. 3 and 5 may be used as the fixed board-like electrode, the manufacturing process thereof will not be explained.

At first, as shown in FIG. 12A, there is prepared an SOI substrate 1 of three-layer structure having a generally rectangular shape and a predetermined size consisting of a silicon dioxide layer (SiO$_2$ layer) 11, and an upper single crystal silicon layer 10T and a lower single crystal silicon layer 10B formed on both surfaces of the silicon dioxide layer 11 each having a predetermined thickness. In this example, the upper single crystal silicon layer 10T is formed such that it has its top surface of (100) crystal face and is much thicker than the lower single crystal silicon layer 10B.

Next, as shown in FIG. 12B, an upper oxide film (SiO$_2$ layer) 51T and a lower oxide film (SiO$_2$ layer) 51B are formed on the surfaces of the upper single crystal silicon layer 10T and the lower single crystal silicon layer 10B by use of a water-vapor oxidizing method or CVD method.

Next, a photoresist is applied on the surface of the upper SiO$_2$ layer 51T, and a mask patterning of the photoresist is carried out to form predetermined windows, and then, portions of the upper SiO$_2$ layer 51T corresponding to areas at which the electrode supports 41-1 and 41-2 are to be formed are removed by etching, thereby to form windows W1 in the upper SiO$_2$ layer 51T as shown in FIG. 12C. Further, there is not shown a window W1 formed in the upper SiO$_2$ layer 51T corresponding to an area at which the electrode support 41-2 is to be formed.

Next, a double layer metal thin film of chromium (Cr) and gold (Au) is deposited by evaporation on the overall surfaces of the upper SiO$_2$ layer 51T including the windows W1, and a mask patterning of a photoresist on the metal thin film is carried out to form predetermined windows, and then, the metal thin film except for portions thereof on the windows W1 and their neighborhoods is removed by etching. As a result, as shown in FIG. 12D, the electrodes 45-1 and 45-2 are formed on the surface of the upper single crystal silicon layer 10T corresponding to areas at which the electrode supports 41-1 and 41-2 are to be formed. The electrode 45-2 is not shown.

Next, a mask patterning of a photoresist on the lower SiO$_2$ layer 51B covering the surface of the lower single crystal silicon layer 10B of the SOI substrate 1 is carried out to form a predetermined window, and then, as shown in FIG. 12E, portions of the lower single crystal silicon layer 10B and the lower SiO$_2$ layer 51B corresponding to an area at which the movable board-like electrode 2-1 is to be formed are removed by etching.

Next, a mask patterning of a photoresist on the exposed surface of the SiO$_2$ layer 11 of the SOI substrate 1 is carried out to form windows W2 for fabricating the beam 21-1 and 21-2 in the SiO$_2$ layer 11 as shown in FIG. 12F.

Figure 12G:
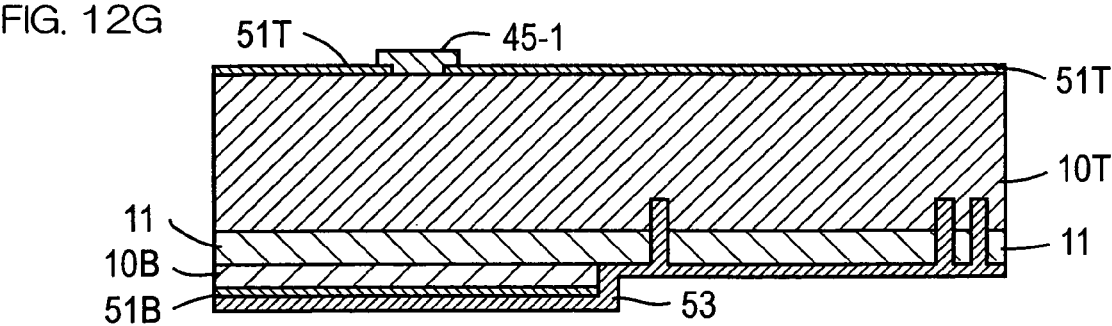

After portions of the lower side of the upper single crystal silicon layer 10T are removed by etching using the windows W2, as shown in FIG. 12G, a photoresist layer 53 is applied to the overall surfaces of the SiO$_2$ layer 11 and the lower SiO$_2$ layer 51B to protect the lower surface of the SOI substrate 1.

Figure 12H:
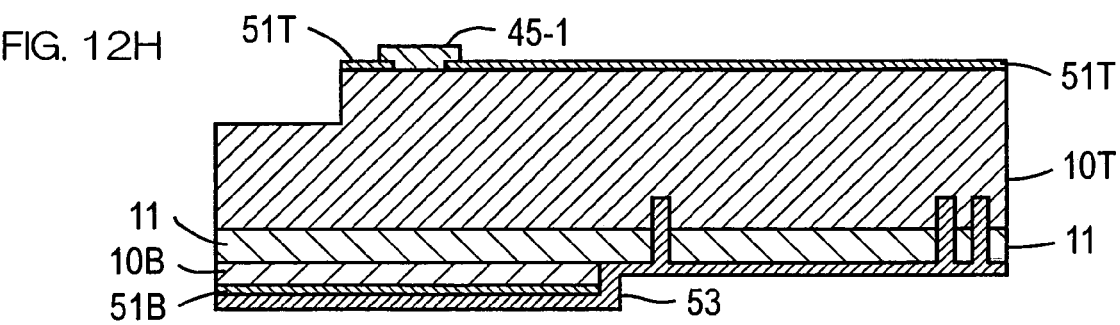

Next, a mask patterning of a photoresist on the SiO$_2$ layer 51 covering the surface of the upper single crystal silicon layer 10T is carried out to form predetermined windows, and then portions of the upper single crystal silicon layer 10T corresponding to peripheral areas of the electrode supports 41-1 and 41-2 on the central leg portion 1C of the SOI substrate 1 are removed by a predetermined thickness or depth by etching to reduce the thickness of the upper single crystal silicon layer 10T. In such case, however, portions of the upper single crystal silicon layer 10T corresponding to areas of the electrode supports on which the flexible beams 21-1 and 21-2 are to be formed are not etched in this process step because the thickness thereof is reduced by an anisotropic wet etching in a later process step. This process step results in separation of the two electrode supports 41-1 and 41-2. In FIG. 12H is shown the state that a portion of the upper single crystal silicon layer 10T corresponding to a peripheral area of the electrode support 41-1 has been removed by the predetermined thickness to reduce the thickness thereof.

Figure 12I:
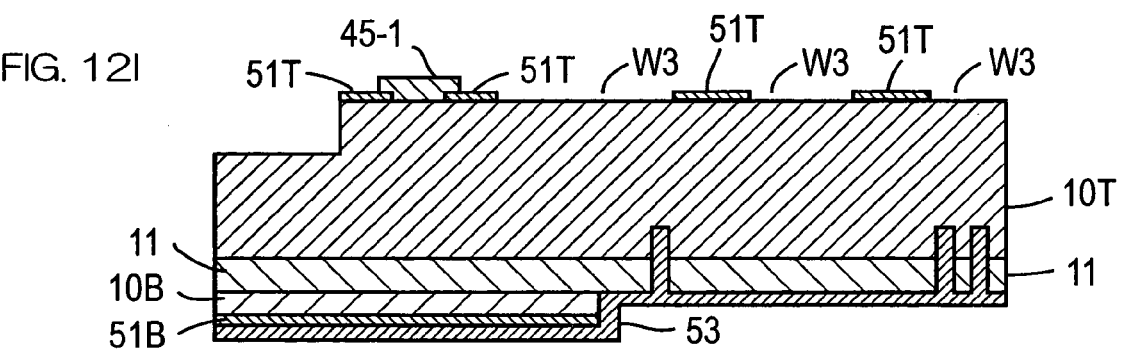

Next, as shown in FIG. 12I, a mask patterning of a photoresist on the surface of the upper SiO$_2$ layer 51T is carried out to form windows W3, and then portions of the upper single crystal silicon layer 10T corresponding to areas on which the mirrors 35-1, 36-1, 35-2, 36-2 and the beams 21-1, 21-2 are to be formed are removed by a considerable depth by an anisotropic wet etching. At the same time, by this anisotropic wet etching, the V-shaped grooves 14A-1, 14A-2 and 14B-1, 14B-2 are formed on areas corresponding to the rectangular portions 1L and 1R of the SOI substrate 1, respectively. Further, as to the beam 21-2, a portion thereof is shown in the figure, and the mirrors 35-2, 36-2 and the V-shaped grooves 14A-1, 14A-2 and 14B-1, 14B-2 are not shown in the figure.

Figure 13:
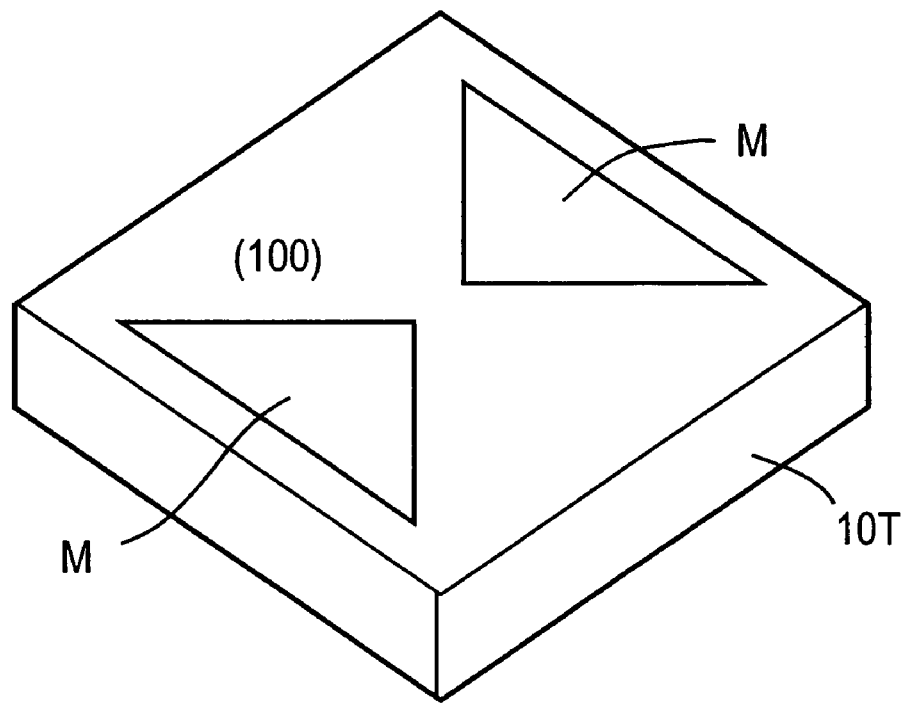
FIG. 13 is a perspective view for explaining the manner that mirrors are fabricated from a single crystal silicon by applying an anisotropic wet etching to the silicon in the optical switch shown in FIG. 8.

There will be explained a chemical anisotropic etching in case of fabricating the mirrors 35-1 and 36-1. As shown in FIG. 13, an SiO$_2$ layer, for example, is formed on the overall surface of a portion of the upper single crystal silicon layer 10T corresponding to an area on which the movable board-like electrode 2-1 is to be formed, and then a mask patterning of a photoresist on the SiO$_2$ layer is carried out to form a pair of masks M. Each of the masks M has a generally right angle isosceles triangular shape, and a pair of the masks M is disposed in such manner that their right-angled vertical angles are opposed to each other with a predetermined space therebetween. The upper single crystal silicon layer 10T has its top surface of (100) crystal face as stated above, and the vertical direction as well as the directions of the silicon layer 10T that extend along two sides of the right angle isosceles triangle containing the vertical angle (the directions of forming an angle of 45° with the V-shaped grooves 14A-1, 14A-2, 14B-1, 14B-2) are (100) directions, and the directions of the silicon layer 10T that extend along the base of the right angle isosceles triangle (the directions in parallel with the V-shaped grooves 14A-1, 14A-2, 14B-1, 14B-2) are (110) directions.

Figure 14:
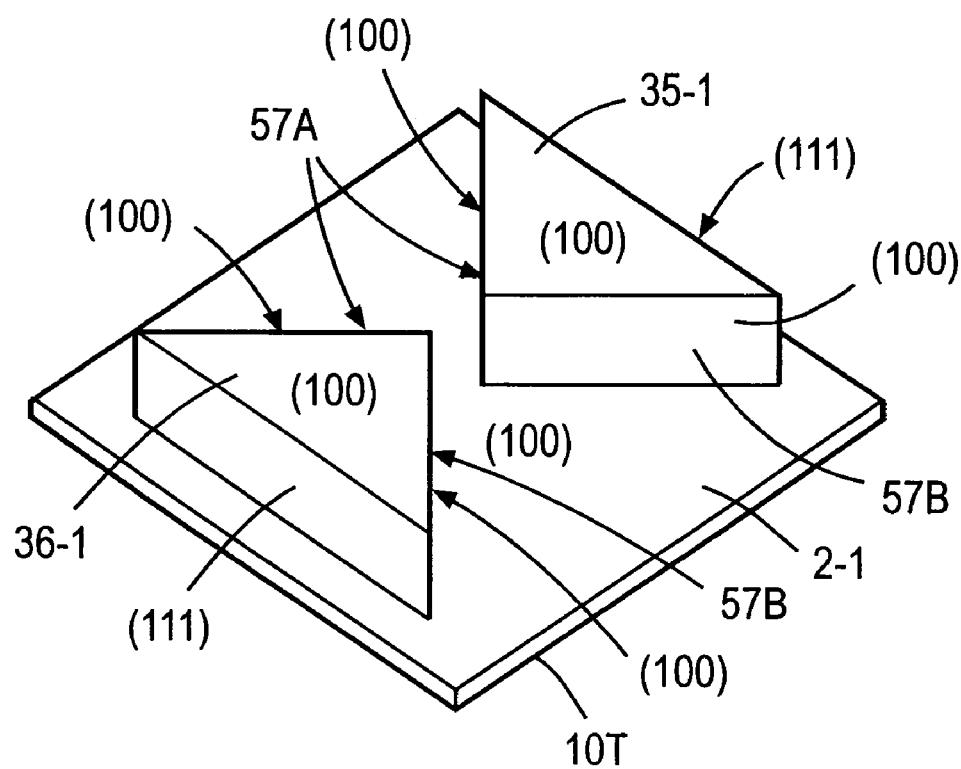
FIG. 14 is a perspective view showing mirrors fabricated by applying an anisotropic wet etching to the silicon.

Next, a chemical anisotropic etching is applied to the upper single crystal silicon layer 10T by use of a suitable etchant. This chemical anisotropic etching applied to the silicon layer 10T results in the two mirrors 35-1 and 35-2 each having a triangular prism-like shape as shown in FIG. 14, the vertical surfaces 57A and 57B of each mirror that form a right angle being (100) crystal face. In this example, a KOH solution of 35 weight percent and 70° C. is used as the etchant.

The vertical surfaces 57A and 57B of each mirror that form a right angle have much high accuracy in their verticality and flatness as described in the above-mentioned paper presented by Philippe Helin, et al., and hence they can reflect an incident light beam with very little optical loss and there is no possibility that the reflected light beam deviates vertically from a horizontal plane. Further, on the vertical surfaces 57A and 57B are deposited by evaporation a metal thin film of two layers consisting of chromium (Cr) and gold (Au) in a later process step thereby to form the mirror surfaces.

Further, in FIG. 14, though each of the fabricated mirrors 35-1 and 36-1 is shown to have a generally right angle isosceles triangular shape, this is for easy understanding thereof. In practice, corners of each mirror become a crystal face of higher order and do not have the same shape as that of each mask M. That is, each corner does not have an angular shape. In particular, the vertical angle portion becomes a considerably collapsed shape. Accordingly, each mirror neither has a generally right angle isosceles triangular shape nor a generally triangular shape. However, the two mirror surfaces 57A and 57B of each mirror form an angle of 90° with each other with high accuracy. In addition, the vertical surface erecting from the base of each of the mirrors 35-1 and 36-1 becomes (111) face, and so it becomes a slanting surface (a surface similar to one of the groove surfaces of the V-shaped groove).

Figure 12J:
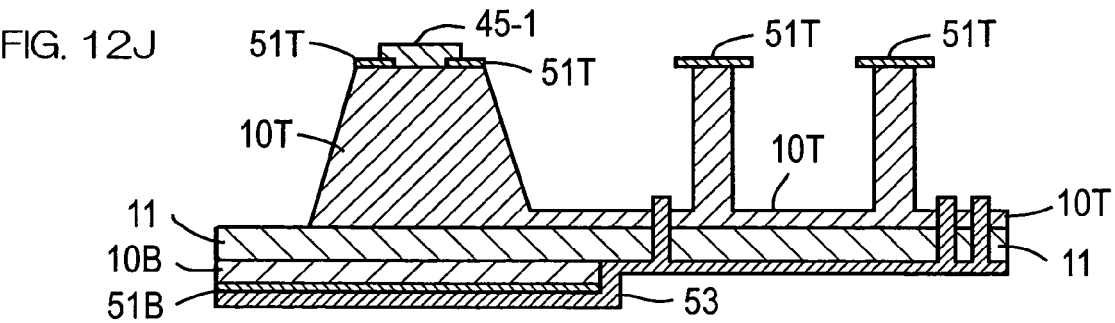

As a result of the anisotropic etching, as shown in FIG. 12J, the portions of the upper single crystal silicon layer 10T corresponding to areas on which the mirrors 35-1, 36-1, 35-2, 36-2 and the beams 21-1, 21-2 are to be formed are removed with only lower side portions thereof remaining as very thin layers. On the other hand, though not shown in the figure, as a result of this anisotropic wet etching, the V-shaped grooves 14A-1, 14A-2 and 14B-1, 14B-2 are formed on areas corresponding to the rectangular portions 1L and 1R of the SOI substrate 1, respectively, in the state as shown in FIG. 10. In such case, the depth of each V-shaped groove is set to have a value larger than the diameter of an optical fiber. Further, the mirrors 35-2, 36-2 and the V-shaped grooves 14A-1, 14A-2, 14B-1, 14B-2 are not shown in FIG. 12J.

Figure 12K:
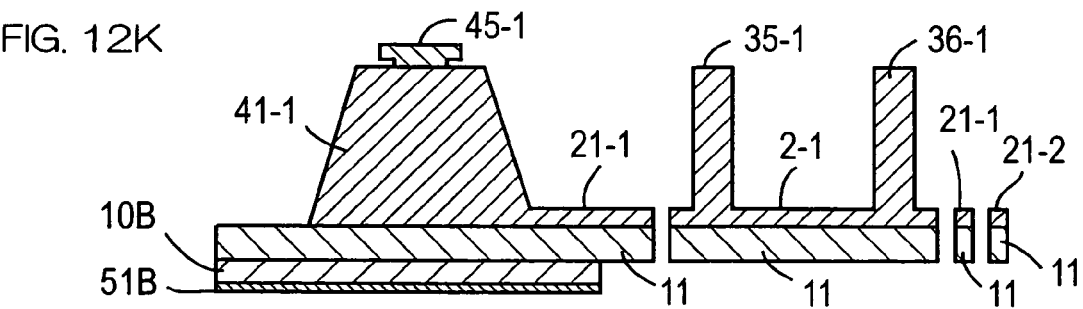

Next, as shown in FIG. 12K, the remaining SiO$_2$ layer on the top surface of the SOI substrate 1 is removed and also the photoresist layer 53 on the lower side of the SOI substrate 1 is exfoliated. Further, in a later process step, the remaining lower SiO$_2$ layer 51B on the lower side of the lower single crystal silicon layer 10B as well as the SiO$_2$ layer 11 except for a portion thereof on which the lower single crystal silicon layer 10B has been formed are removed so that the opening 43 (see FIG. 8) is formed below the movable board-like electrodes 2-1, 2-2 and the beams 21-1, 21-2. Thus, the optical switch shown in FIGS. 8 to 11 is manufactured.

As discussed above, when the mirrors 35-1, 36-1, 35-2, 36-2 and the V-shaped grooves 14A-1, 14A-2, 14B-1, 14B-2 are concurrently fabricated by applying an anisotropic wet etching to the single crystal silicon layer having its top surface of (100) crystal face, mask patternings before the anisotropic wet etching is carried out can be done at a time. Since the anisotropic wet etching is carried out only once, the mirrors and the V-shaped grooves can be formed at the same time by one mask patterning and one anisotropic wet etching, which results in a remarkable improvement in working efficiency or manufacturing process.

Furthermore, as the mirrors and the V-shaped grooves are concurrently fabricated by the anisotropic wet etching, the single crystal silicon layer is etched once using the identical etchant, and hence the etching rates for the opposed mirror surfaces 35-1A and 36-1A, 35-1B and 36-1B of one pair of mirrors 35-1, 36-1 as well as for the opposed mirror surfaces 35-2A and 36-2A, 35-2B and 36-2B of the other pair of mirrors 35-2, 36-2 can be controlled to become substantially the same as the etching rates for the adjacent V-shaped grooves 14A-1, 14A-2 and 14B-1, 14B-2 in parallel with each other. Accordingly, it is possible that a deviation of the axis of an optical path due to errors in the etching rate, the etching time, and the like is made substantially zero, and therefore, light beams emitted respectively from the output side optical fibers that are located and fixed in the V-shaped grooves respectively can be reflected substantially perfectly by the mirrors to enter the reflected light beams into the corresponding input side optical fibers that are located and fixed in the V-shaped grooves respectively.

Figure 15:
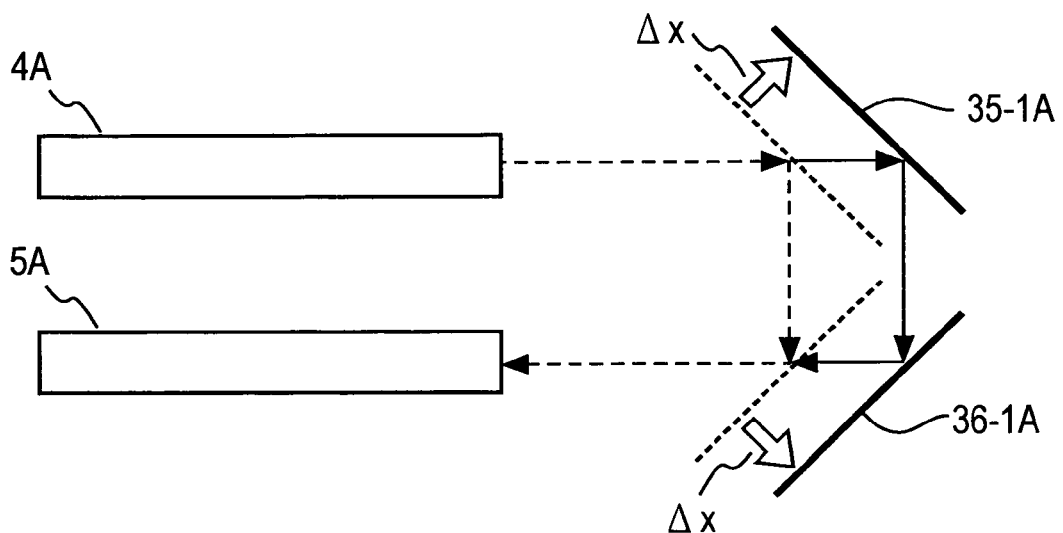
FIG. 15 is an outlined plan view for explaining the manner that two opposed mirror surfaces are fabricated to always form a right angle to each other whether the etching time is longer or shorter.

The above-mentioned matter will be further discussed with reference to FIGS. 15 and 16. FIG. 15 is a plan view for explaining the manner that a light beam propagates in case the opposed mirror surfaces 35-1A and 36-1A of a pair of mirrors 35-1 and 36-1 are removed in surplus by Δx due to an error in the etching time when the mirrors 35-1 and 36-1 are concurrently fabricated by application of the anisotropic wet etching mentioned above using the same etchant.

In FIG. 15, the etching rates for the opposed mirror surfaces 35-1A and 36-1A are substantially the same because each of the mirror surfaces is (100) crystal face. Accordingly, even if there occurs an error in the etching time, for example, even if the etching time becomes longer than a predetermined etching time and the mirror surfaces 35-1A and 36-1A are removed by the etching in surplus by Δx so that they are displaced from the normal positions shown by a dotted line in FIG. 15 to positions shown by a bold solid line, an angle formed by the mirror surfaces 35-1A and 36-1A remains a right angle and does not vary. As a result, as shown by a solid line in the figure, a light beam emitted from the output side optical fiber 4A is incident on the mirror surface 35-1A correctly at an angle of 45° thereto, and reflected by the mirror surface 35-1A in the direction that forms correctly an angle of 90° with the incident light beam in the same horizontal plane. Accordingly, the reflected light beam is incident on the mirror surface 36-1A correctly at an angle of 45° thereto, and reflected by the mirror surface 36-1A in the direction that forms correctly an angle of 90° with the incident light beam in the same horizontal plane so that the reflected light beam is entered into the input side optical fiber 5A.

In such manner, with the construction that an incident light beam is reflected twice, 90° by 90°, using two opposed mirror surfaces each of which is (100) crystal face, whether the etching time is longer or shorter, an angle formed by the mirror surfaces 35-1A and 36-1A to be fabricated always becomes 90° (right angle) and each of the mirror surfaces 35-1A and 36-1A always maintains a required angle (45°) with an incident light beam. Accordingly, there is no deviation of the axis of an optical path in the horizontal plane. In other words, without any need to control the etching time with high precision, it is possible to concurrently fabricate the opposed two mirror surfaces 35-1A and 36-1A, 35-1B and 36-1B, 35-2A and 36-2A, and 35-2B and 36-2B each pair always forming an angle of 90° with each other with high accuracy. Consequently, no deviation occurs as to the axis of an optical path in the horizontal plane, and it is possible to reflect an incident light beam by an angle of 180° in total with little optical loss to emit the reflected light beam.

Figure 16:
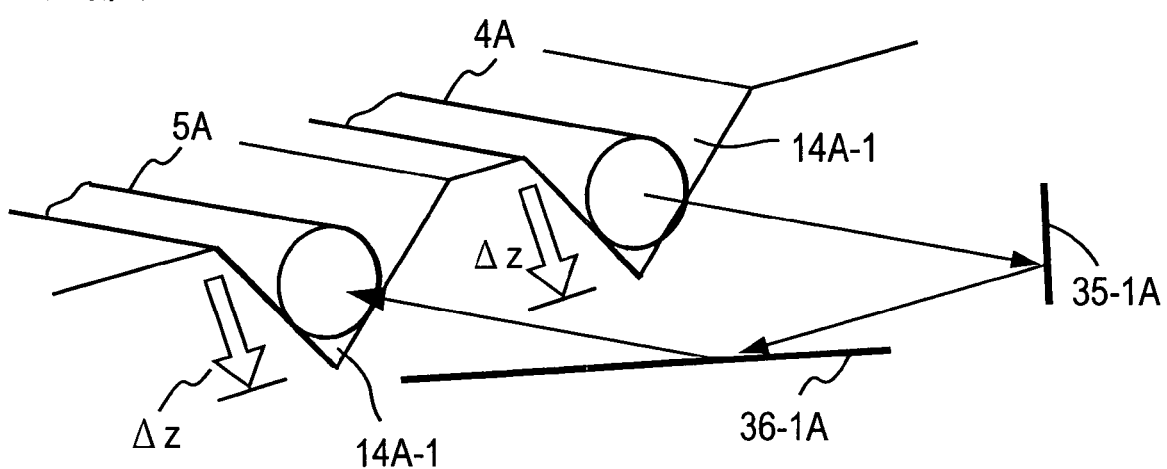
FIG. 16 is an outlined perspective view for explaining the manner that adjacent two V-shaped grooves are fabricated to have substantially the same shape and depth whether the etching time is longer or shorter.

FIG. 16 is a perspective view for explaining the manner that the depths Δz of adjacent two V-shaped grooves (for securing an output side optical fiber and for securing an input side optical fiber) 14A-1 in parallel with each other are not changed even if there is an error in the etching time, in case the adjacent two V-shaped grooves 14A-1 are concurrently fabricated by application of an anisotropic wet etching using the same etchant.

In FIG. 16, the etching rates for the adjacent V-shaped grooves 14A-1 are substantially the same. In addition, the groove surfaces or walls of each V-shaped groove 14A-1 that form a letter of "V" are (111) crystal faces and therefore, the etching rates therefor are considerably smaller than the etching rate for (100) crystal face. Accordingly, even if there is an error in the etching time, that is, whether the etching time is longer or shorter, when the etching depths Δz of these V-shaped grooves 14A-1 reach (111) crystal faces, they hardly go forward thereafter. Therefore, an output side optical fiber 4A positioned and fixed in one of the V-shaped grooves 14A-1 and an input side optical fiber 5A positioned and fixed in the other of the V-shaped grooves 14A-1 are always situated at the same horizontal level, and hence there occurs no deviation of a light beam in the vertical direction and no deviation occurs as to the axis of an optical path in the horizontal plane. As a result, a light beam emitted from the output side optical fiber 4A is incident on the mirror surface 35-1A correctly at an angle of 45° thereto, and reflected by the mirror surface 35-1A in the direction that forms correctly an angle of 90° with the incident light beam in the same horizontal plane. Accordingly, the reflected light beam is incident on the mirror surface 36-1A correctly at an angle of 45° thereto, and further reflected by the mirror surface 36-1A in the direction that forms correctly an angle of 90° with the incident light beam in the same horizontal plane so that the reflected light beam is entered into the input side optical fiber 5A.

In such manner, since the etching of the adjacent V-shaped grooves hardly goes forward when the V-shaped grooves reach (111) crystal faces, the etching depths thereof are substantially the same so that without any need to control the etching time with high precision, it is possible to concurrently fabricate the adjacent V-shaped grooves 14A-1, 14A-2, 14B-1, 14B-2 for always positioning an output side optical fiber and an input side optical fiber at the same horizontal level. In addition, if there is adopted such a construction that two V-shaped grooves are juxtaposed in parallel with each other, as shown in FIG. 8, a multi-channel 2×2 optical switch can be manufactured in a small space.

In the above-mentioned embodiment, a KOH solution of 35 weight percent and 70° C. has been used as the etchant, but it is needless to say that other etchants may be used. In addition, though the mirrors and the V-shaped grooves have been concurrently fabricated by applying an anisotropic wet etching to a single crystal silicon layer having its top surface of (100) crystal face, the mirrors and the V-shaped grooves may be concurrently fabricated by application of an anisotropic dry etching.

In addition, the two mirrors each of which has two mirror surfaces forming a right angle with each other have been fabricated on each of the movable board-like electrodes by applying an anisotropic wet etching to a single crystal silicon layer having its top surface of (100) crystal face, but it is needless to say that four thin board-like mirrors as shown in FIG. 4 may be fabricated on each of the movable board-like electrodes by applying an anisotropic wet etching to a single crystal silicon layer having its top surface of (100) crystal face. In case of fabricating the four thin board-like mirrors, they can be fabricated by forming four masks each having a generally rectangular shape on the surface of a single crystal silicon layer having its top surface of (100) crystal face in such manner that the four masks are disposed at angular intervals of 90° and the major sides of adjacent two masks form a right angle with each other, and thereafter by applying an anisotropic wet etching to the single crystal silicon layer. Each of the formed thin board-like mirrors is provided with its mirror surface having a generally trapezoidal shape. In this case, since the two opposed mirror surfaces are (100) crystal faces, they form correctly a right angle with each other, and so the accuracy in verticality and flatness thereof comes to much high. Accordingly, it is clear that the same function and effects as those already described can be obtained. Further, on the vertical surfaces of each mirror has been deposited by evaporation a metal thin film of two layers consisting of chromium and gold thereby to form the mirror surfaces, but a metal thin film of one layer may be coated on the vertical surfaces of each mirror. In addition, a metal thin film may be coated on the vertical surfaces of each mirror by any means or method other than evaporation. It is a matter of course that a suitable substance or material having high reflectivity other than a metal may be coated on the vertical is surfaces of each mirror.

Moreover, in the above embodiment, the V-shaped grooves each having its depth larger than the diameter of an optical fiber have been fabricated on the rectangular portions of the SOI substrate, each rectangular portion having its vertical side longer than its horizontal side, concurrently with the mirrors by application of an anisotropic etching. However, it may be possible that in the process step of removing by etching portions of the upper single crystal silicon layer corresponding to peripheral areas of the electrode supports on the central leg portion of the SOI substrate to reduce the thickness thereof to a predetermined thickness, the rectangular portions of the SOI substrate are removed by etching at the same time to make them thin film-like portions, and that when the mirrors are fabricated by application of an anisotropic etching, shallow V-shaped grooves for merely positioning optical fibers are concurrently formed on the thin film-like portions. It is a matter of course that the substrate is not limited to an SOI substrate.

As is clear from the foregoing, in the present invention, since a plurality of mirrors each of which has a mirror surface of (100) crystal face and in which two opposed mirror surfaces form a right angle with each other as well as V-shaped grooves for positioning and fixing optical fibers that are aligned with the mirrors respectively are concurrently fabricated by applying an anisotropic etching to a single crystal silicon layer having its surface of (100) crystal face using the same etchant, each mirror and corresponding one V-shaped groove are aligned with each other with high accuracy. In addition, whether the etching time is longer or shorter, the two opposed mirror surfaces form correctly a right angle and there occurs no deviation of the axis of an optical path in the horizontal plane. The accuracy in verticality and flatness of each mirror surface are always high irrespective of the etching time, and also, in the vertical plane, no deviation as to the axis of an optical path occurs. Accordingly, there is obtained a remarkable advantage that the mirrors can always reflect an incident optical signal emitted from an output side optical fiber two times with high accuracy in the same horizontal plane by the two opposed mirror surfaces with little optical loss and enter the reflected optical signal into an input side optical fiber.

In addition, since the mirrors and the V-shaped grooves are concurrently fabricated by applying an anisotropic etching to a single crystal silicon layer having its top surface of (100) crystal face, mask patternings before the anisotropic etching is carried out can be done at a time. The anisotropic etching is carried out only once, and hence the mirrors and the V-shaped grooves can be fabricated at the same time by one mask patterning and one anisotropic etching. Moreover, there is no need to control the etching time with high precision, and therefore, there are also obtained advantages that the optical switch can be manufactured with very ease and the working efficiency is greatly improved.

While the present invention has been described with regard to the preferred embodiment shown by way of example, it will be apparent to those skilled in the art that various modifications, alterations, changes, and/or minor improvements of the embodiment described above can be made without departing from the spirit and the scope of the present invention. Accordingly, it should be understood that the present invention is not limited to the illustrated embodiment, and is intended to encompass all such modifications, alterations, changes, and/or minor improvements falling within the scope of the invention defined by the appended claims.

What is claimed is:

1. An optical switch comprising:
a single crystal silicon substrate the top surface of which has a Miller index(100);
a fixed board-like electrode;
a movable board-like electrode that consists of a portion of said single crystal silicon substrate;
a flexible beam-like element that consists of a portion of said single crystal silicon substrate and supports said movable board-like electrode for vertical movement and in parallel with said fixed board-like electrode with a predetermined space between it and the fixed board-like electrode;
two mirrors each of which consists of a portion of said single crystal silicon substrate and that includes two vertical crystal faces having a Miller index (100) and forming a right angle with each other, wherein the vertical crystal faces are coated with a substance having high reflectivity and the two mirrors are formed integrally on the surface of said movable board-like electrode such that they are opposed to each other with a gap therebetween and each of the two vertical crystal faces of one mirror forms a right angle with an opposed vertical crystal face of the other mirror;
four V-shaped grooves that are formed on the single crystal silicon substrate along two straight lines in parallel with each other passing through the two mirrors, wherein two of said four grooves are formed along one straight line such that each groove is aligned with a respective vertical crystal face of one minor and the remaining two grooves are formed along another straight line such that each groove is aligned with a respective vertical crystal race of the other mirror;
four optical fibers that are positioned and fixed in corresponding four V-shaped grooves respectively, wherein each of the four optical fibers is aligned with a respective vertical crystal face of the two mirrors; and
wherein by applying a voltage between the fixed board-like electrode and the movable board-like electrode, the movable board-like electrode and the mirrors are moved together toward the fixed board-like electrode thereby to switch an optical path for an incident optical signal.

2. The optical switch as set forth in claim 1, wherein two of the V-shaped grooves are formed on a portion of said single crystal silicon substrate apart from one side of the movable board-like electrode and the remaining two of the V-shaped grooves are formed on a portion of said single crystal silicon substrate apart from the opposite side of the movable board-like electrode, the two V-shaped grooves on the one side and the two V-shaped grooves on the opposite side being opposed to and aligned with each other.

3. The optical switch as set forth in claim 1, wherein the two mirrors, the movable board-like electrode, the flexible beam-like element, and the four V-shaped grooves are those formed simultaneously in said single crystal silicon substrate in accordance with a chemical anisotropic wet etching process.

4. The optical switch as set forth in claim 1, wherein the two mirrors are erect from the surface of the movable board-like electrode and each of the two mirrors has generally a right angle isosceles triangular shape in plan.

5. The optical switch as set forth in claim 1, wherein said single crystal silicon substrate is a thicker single crystal silicon layer of an Silicon on Insulator (SOI) substrate of three-layer structure comprising a silicon dioxide layer, a thinner single crystal silicon layer formed on one surface of the silicon dioxide layer and the thicker single crystal silicon layer formed on the opposed surface of the silicon dioxide layer, wherein the two minors, die movable board-like electrode, the flexible beam-like element, and the four V-shaped grooves are formed simultaneously in the thicker single crystal silicon layer in accordance with a chemical anisotropic wet etching process.

6. The optical switch as set forth in claim 1, further including an electrode support to which one end of the flexible beam-like element is integrally connected, and wherein said electrode support is formed simultaneously with the two mirrors, the movable board-like electrode, the flexible beam-like element and the four V-shaped grooves in said single crystal silicon substrate in accordance with the chemical anisotropic wet etching process.

7. An optical switch comprising:
a fixed board-like electrode;
a movable board-like electrode;

a flexible beam-like element that supports said movable board-like electrode for vertical movement and in parallel with said fixed board-like electrode with a predetermined space between it and the fixed board-like electrode;

two mirrors each of which includes two vertical crystal faces having a Miller index (100) and forming a right angle with each other, wherein die two mirrors are formed integrally on the surface of said movable board-like electrode such that they are opposed to each other with a gap therebetween and each of the two vertical crystal faces of one mirror forms a right angle with an opposed vertical crystal face of the other minor; and four V-shaped grooves in which four optical fibers are to be fixed respectively, that are formed on a single crystal silicon substrate with a top surface having a Miller index (100), the four V-shaped grooves being Conned along two straight lines in parallel with each other passing through the two mirrors, wherein two of said four grooves are formed along one straight line such that each groove is aligned with a respective vertical crystal face of one minor and the remaining two grooves are formed along the other straight line such that each groove is aligned with a respective vertical crystal face of the other mirror, and wherein said movable board-like electrode, said two mirrors, said flexible beam-like element, and said four V-shaped grooves are those formed simultaneously in said single crystal silicon substrate in accordance with a chemical anisotropic wet etching process.

8. The optical switch as set forth in claim 7, wherein the two mirrors are erect from the surface of the movable board-like electrode and each of the two mirrors has generally a right angle isosceles triangular shape in plan.

9. The optical switch as set forth in claim 7, wherein said single crystal silicon substrate is a ticker single crystal silicon layer of an Silicon on Insulator (SOI) substrate of three-layer structure comprising a silicon dioxide layer, a thinner single crystal silicon layer formed on one surface of the silicon dioxide layer and the thicker single crystal silicon layer formed on the opposed surface of the silicon dioxide layer, wherein the two mirrors, the movable board-like electrode, the flexible beam-like clement, and the four V-shaped grooves are formed simultaneously in the thicker single crystal silicon layer in accordance with a chemical anisotropic wet etching process.

10. The optical switch as set forth in claim 7, further including an electrode support to which the flexible beam-like element is integrally connected, and wherein said electrode support is formed simultaneously with the two mirrors, the movable board-like electrode, the flexible beam-like element and the four V-shaped grooves in said single crystal silicon substrate in accordance with the chemical anisotropic wet etching process.

11. A method of manufacturing an optical switch comprising the steps of:

preparing a single crystal silicon substrate the top surface of which has a Miller index (100); and applying a chemical anisotropic wet etching process to said single crystal silicon substrate thereby reducing the thickness of the single crystal silicon substrate except for portions thereof where two mirrors are to be formed, and forming simultaneously in the single crystal silicon substrate, a movable board-like electrode, a flexible beam-like element one end of which is connected integrally to said movable board-like electrode, said two mirrors being erect from the surface of the movable board-like electrode, each of which includes two vertical crystal faces having a Miller index (100) and forming a right angle with each other, and four V-shaped grooves in which four optical fibers are to be fixed, wherein said two mirrors are formed integrally on the surface of said movable board-like electrode such that they are opposed to each other with a gap therebetween and each of the two vertical crystal faces of one mirror forms a right angle with an opposed vertical crystal face of the other mirror, and said four V-shaped grooves are formed on the single crystal silicon substrate along two straight lines in parallel with each other passing through the two mirrors, two of said four grooves being formed along one straight line such that each groove is aligned with a respective vertical crystal face of one mirror and the remaining two grooves being formed along the other straight line such that each groove is aligned with a respective vertical crystal face of the other mirror.

12. The method as set forth in claim 11, wherein said single crystal silicon substrate is a thicker single crystal silicon layer of an Silicon on Insulator (SOI) substrate of three-layer structure comprising a silicon dioxide layer, a thinner single crystal silicon layer formed on one surface of the silicon dioxide layer and the thicker single crystal silicon layer formed on the opposed surface of the silicon dioxide layer, and further including a step of removing portions of said silicon dioxide layer and said thinner single crystal silicon layer below the movable board-like electrode to form an opening through which the movable board-like electrode can vertically move.

* * * * *